May 12, 1970   J. V. ERWIN   3,511,563
PROJECTOR
Filed Nov. 14, 1967

INVENTOR.
JAMES V. ERWIN
BY
Carpenter Kinney & Boulter
ATTORNEYS

United States Patent Office 3,511,563
Patented May 12, 1970

3,511,563
PROJECTOR
James V. Erwin, North St. Paul, Minn., assignor to Minnesota Mining and Manufacturing Company, St. Paul, Minn., a corporation of Delaware
Filed Nov. 14, 1967, Ser. No. 682,951
Int. Cl. G03b 21/14
U.S. Cl. 353—38                                            12 Claims

ABSTRACT OF THE DISCLOSURE

An overhead projector having a glare-producing condensing lens includes a shield to eliminate glare at the operator's position without substantially reducing the intensity of the projected light.

DESCRIPTION

This invention relates to optical devices, and in one important aspect more particularly to an improvement in overhead projectors and to the means for accomplishing the same.

A form of overhead projector which has enjoyed widespread acceptance for classroom use, for example as described in U.S. Pat. No. 3,126,786, comprises, in order, a source of intense illumination, a condensing lens which is preferably in the form of a Fresnel lens, a flat stage, and a focusing projection head. Means for minimizing heating effects may be included if desired. In use, a projection transparency is laid on the stage and the image is focused on a screen. The operator stands at the side or a rear corner of the projector and facing the audience, and while speaking may point to significant portions of the transparency, or mark the same as desired, the pointer and marks being visible on the screen to the watching audience. During this procedure, the transparency is fully accessible to the operator. However the intensity of extraneous light from the projector is so great as to interfere severely with the ability of the operator to view both the transparency and the audience. Either he is temporarily partially blinded by the glare so that he cannot see the audience, or he may employ dark glasses to protect his eyes and then must remove the glasses to view the audience, or he finds it necessary to reduce the intensity of light from the source and thereby makes the projected image less easily visible to the audience.

The effect of extraneous light, obtained by internal reflection at the condensing lens, is generally disturbing to the operator, and is particularly distressing in the case of projectors employing a flat Fresnel condensing lens. The structure of such lenses inherently results in a concentration of light visible along that diameter of the lens which extends toward, or is in line with, the operator, and which has been aptly described as the "propeller effect" because of the propeller-like shape of the visibile area of high light intensity and the movement of the beam as the viewer circles the projector.

The present invention overcomes these defects and difficulties of the prior art. The transparency remains fully visible to the operator, but the amount of extraneous light or glare reaching his eye is drastically reduced or almost completely eliminated. At the same time, the intensity of the projected image is not equivalently reduced, but remains at a high level. Thus the operator is enabled to glance momentarily at the transparency for purposes of marking or pointing to the same, and then immediately return his glance to the audience, without any temporary blindness or any visual discomfort, while the projected image remains clearly visible to the audience.

These results are accomplished by incorporating in the projector, within the projection beam or light path and preferably but not necessily between the condensing lens and the transparent stage, a glare-reducing shield or light controlling panel having light blocking dicontinuities which permits passage of light from the lens toward the projection optic while preventing or greatly minimizing the lateral diffusion of extraneous light in the direction of the operator. Thus the control member may be placed between the lens and the stage, or upon the outer face of the stage; or it may itself serve as the stage; or it may be combined with a Fresnel condensing lens; or the lens, control member and stage may be incorporated in a single integral structure; or the transparency may incorporate the control structure.

The principles of the invention will now be further described in connection with the appended illustrative drawing, in which.

Figure 1:
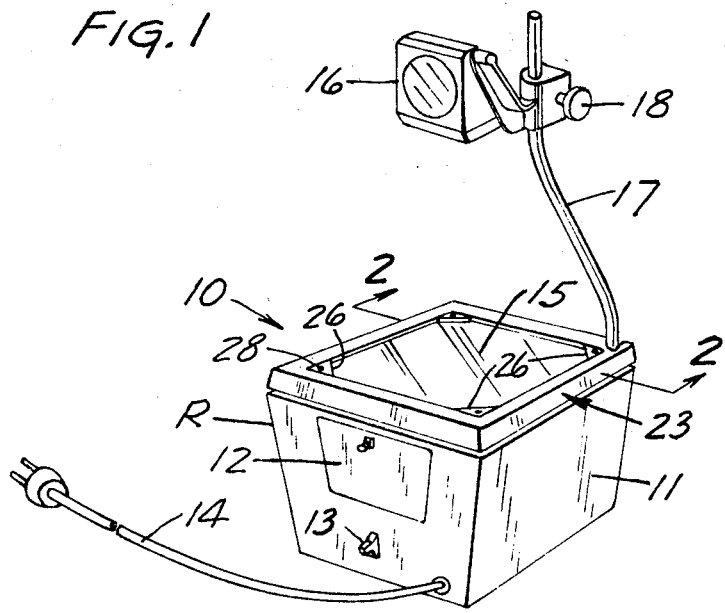
FIG. 1 is a view in prespective of a popular commercial form of overhead projector, modified in accordance with the present invention.

The projector 10 of FIG. 1 comprises a case 11 containing a lamp and reflector assembly accessible through a door 12 and connected through a switch 13 with a cord and plug assembly 14 for connection to a source of electric power. The case also contains fan means for cooling purposes. A stage 15 supported in a frame 23 forms a top for the case and a support for projection transparencies, and is held in place by wedge-shaped retainers 26 and screws 28. A projection head 16 is supported above the center of the stage on a support 17 and is vertically adjustable for focusing of the projected image by means of knob 18 and associated gearing.

Figure 2:
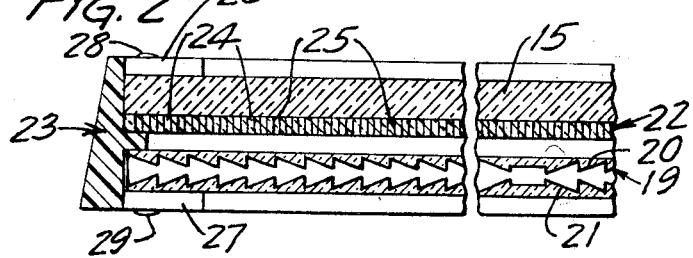
FIG. 2 is a partial vertical cross-section taken along line 2—2 of FIG. 1 illustrating one embodiment of the invention.

As shown in greater detail in FIG. 2, there is included in the projector a Fresnel condensing lens unit 19, in this instance consisting of upper and lower lenses 20, 21 respectively, also held in place in the frame 23 by a retainer 27 and screw 29 at each corner. A glare shield 22 is disposed within the frame 23 directly beneath the stage 15 and separated from the lens 19, this being a presently preferred position. The shield 22 is illustrated as comprising a transparent planar matrix in the form of a series of transparent linear segments 24 separated by very thin opaque masking films 25. Small triangular segments are removed at each corner of the square stage 15 and shield 22 to permit placement of retainers 26 and screws 28.

Figure 2A:
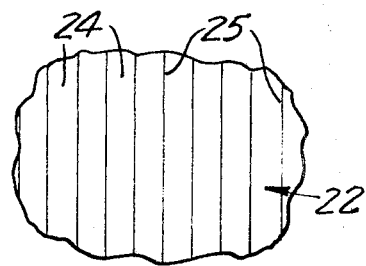
FIG. 2a is a partial plan view of the glare-reducing shield element thereof.

A glare shield of the type shown in FIGS. 2 and 2a may be made by skiving a thin panel from a solid block of superposed thermoplastic transparent films each coated on one surface with a thin layer of black varnish, for example as described in U.S. Pat. No. 2,053,173. Typically, the panel may be 0.9 mm. in thickness, the black bands then being 0.9 mm. in height and approximately 0.3 mm. apart, giving an aspect ratio of 3. Panels made as described and having a band height to band separation ratio, i.e. an aspect ratio, of between about 2 and about 4 are found to have a high degree of effectiveness in overhead projectors of the type shown in FIG. 1. The flat surfaces of the panel are made optically clear and transparent, e.g. by polishing or by pressing against heated polished platens. Placing the panel just beneath the transparent stage 15, in the position shown for glare shield 22 in FIG. 2, and with the opaque bands or louvers 25 lying parallel to the side edges of the stage 15 (and to the vertical plane of the axis of projection from the head 16), effectively controls glare at both sides of the projector.

In many cases a right-handed operator will take a position near the corner R as indicated in FIG. 1, at a distance just sufficient to permit easy hand contact with the stage while keeping the shoulder out of the projected beam; and the panel 22 may if desired be constructed with the louvers at right angles to that position, in which case the aspect ratio may be somewhat reduced.

Variable orientation of the glare shield panel may be achieved by simply removing the panel and replacing it in a different orientation; or the panel may be given a circular outline, rotatably suspended in a suitable circular frame within the frame 23, and oriented by partial rotation using a protruding handle member, to place the louvers in the most appropriate position for any particular position of the operator. For best results, the louvers should lie across and at right angles with that diameter of the plate which extends toward the operator. In most cases, however, the louvered panel provides fully adequate relief from glare when constructed as described and suspended in the position indicated in FIGS. 1 and 2, with the louvers parallel to the sides of the frame and crossing the said diameter at an angle not less than about 45 degrees.

Figure 3:
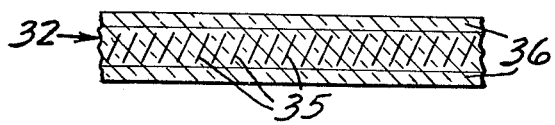
FIGS. 3–7 illustrate, in partial cross-section, alternative forms of glare-reducing shields or control elements.

It is possible to provide for sloping of the louvers, as indicated by louvers 35 in panel 32 of FIG. 3, for example by skiving at an appropriate angle from the block of superposed painted films of Pat. No. 2,053,173. Various combinations of angles may be provided, e.g. by skiving along appropriate curves or by curving the initially flat panel. A particularly effective structure may be obtained by distorting an initially flat panel such as panel 22 of FIG. 1 into the shape of a shallow bowl fitting within the space between the stage 15 and the lens 19. By such means panels may be constructed wherein the louvers are positioned vertically at the center and at increasing angles to the vertical as they approach the side edges of the panel, to provide minimal obstruction to the rays of the projection light beam from the condensing lens 19 while still adequately controlling glare as seen from the anticipated position of the operator. Another useful form of shield, which however is more difficult to manufacture, has the opaque louvers arranged in concentric rings, also ranging from vertical at the center to an increasing inclination at the outer edges in a series of conical segments each parallel to the paths of the rays from the condensing lens at the position of the louver.

In the structure shown in FIG. 3, the louvered panel is covered at both surfaces with a layer of transparent material 36, such for example as glass or plastic, and may itself serve as the stage for supporting the projection transparency. Analogously, the louvered panel may be combined with the Fresnel lens 19 in an integral structure.

In an example, a block of the required dimensions is first prepared as a lay-up of sheets of cellulose acetate butyrate each coated on one surface with a thin opaque layer of carbon black in a solution of the same polymer. The block is consolidated under heat and pressure and is skived to produce thin louvered transparent flat panels. Over each skived face is placed a thin film of plasticized polyvinyl butyral followed by a pane of glass, and the whole is then pressed together at an elevated temperature to provide an integral structure having a cross-section somewhat as illustrated in FIG. 3 but with the louvers perpendicular to the surface of the panel as in FIG. 2. The technique employed will be recognized as substantially identical with that used in the manufacture of safety glass.

The presence of the opaque strips or louvers 25 in control panel 22 results in absorption of a small portion of the useful light from the condensing lens and in a slight reduction in the intensity of the projected image. The effect is minimized by using the fewest possible number of louvers, by making the louvers as thin as possible, and by positioning them as nearly as possible parallel to the light rays from the condensing lens 19, as hereinbefore noted.

Figure 4:
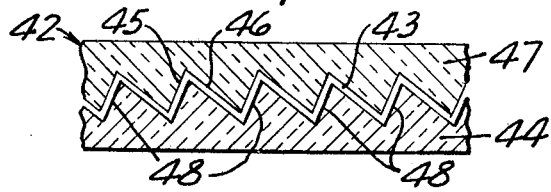
Figure 5:
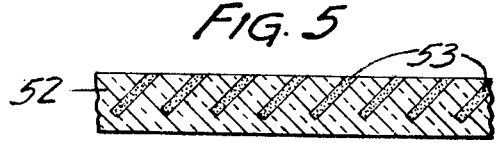
Figure 6:

Loss of projection light in the glare shield panel may also be minimized by means of structures illustrated in FIGS. 4–6.

FIG. 4 illustrates a glare shield panel 42 consisting of two intermeshing longitudinally grooved plates 44, 47 providing an air space 43 therebetween. Such a structure has been described in U.S. Pat. No. 3,255,665. The angles of the faces of the grooves with the perpendicular (as viewed in the drawing) are such that the faces 45 will be mainly parallel to the useful light rays coming from the condensing lens 19 throughout the critical area. The lower plate 44 is silvered or otherwise made specularly reflective along the corresponding faces as shown by heavy lines 48 in the drawing. The remaining faces 46 are at an angle such that the useful rays directed toward the projection head will pass through the panel but the glare rays will be totally reflected. The grooves and ridges formed by the intersecting faces 45, 46 cross that diameter of the lens which is in line with the anticipated position of the eye of the operator at right angles thereto, which in most instances means that they are disposed diagonally of the stage 15, the operator's position being adjacent the corner R. They may alternatively be in the form of concentric circles or a continuous spiral.

The panel 52 of FIG. 5 contains a series of narrow slanted parallel grooves 53 which are filled with non-reflective particles, for example of pigment or powdered glass. The spacings and angular relationships are so selected that a glare ray which normally would emerge in the direction of the operator's eye is absorbed or diffused by the particles, whereas a ray directed by the lens toward the projection head is internally doubly reflected and emerges slightly displaced from but parallel to the line of incidence.

FIG. 6 illustrates a still different control panel 62, consisting of two intermeshing grooved plates 63 and 64 having a series of parallel intermeshing prismatic ridges separated by an air space 65 and which are to be longitudinally oriented toward the position of the operator rather than at right angles thereto as in the structure of FIGS. 4 and 5. Light rays entering from below and in a plane generally perpendicular to the peaks of the ridges pass through the panel, whereas rays of extraneous light approaching at a considerable angle to said plane are totally reflected at the prism-air interface and prevented from emerging as glare.

It will be appreciated that the specific angular and spatial relationships of the several surfaces in structures such as shown in FIGS. 3–6 will differ with different materials, since they depend on the refractive index and other properties of the particular materials employed.

Figure 7:
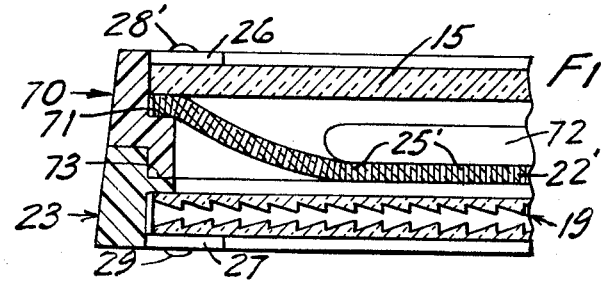

The presently preferred structure illustrated in FIG. 7 employs a second frame member 70 fitting over the frame 23 of the projector of FIGS. 1 and 2. The stage 15 is retained within the frame 70 by retainers 26 and screws 28'. The two side edges of a flexible glare shield 22' rest on ledges 71 formed in the frame, and the stage rests on the edges of the shield. At the two ends of the frame, narrow ledges 72 force the corresponding edges of the shield into a rounded contour and against the lower ridge 73 of the original frame 23. As a result, the shield 22' is given a flat-bottomed trough-like shape with rather abruptly upwardly curved side edges, the cross-section as illustrated being that of a shallow bowl. The louvers 25' protect the operator from glare arising at the Fresnel lens surfaces. The shape of the edges tends to reduce or eliminate any secondary glare which might otherwise be caused by reflection from the surface of the shield itself.

The entire upper unit fits directly onto the original frame of the machine and serves as an easily installed accessory or replacement support for the original stage 15, although equivalent results may be achieved by substituting a correspondingly shaped single frame for the combination of frames 23 and 70.

What is claimed is as follows:

1. An overhead projector including a light source, a stage for supporting a transparency containing projection images, a projection head, and a condensing lens for directing light from said source through said stage to said projection head for projection of said images onto a viewing screen, characterized by including, in a position within the light path between said lens and said projection images, a glare-reducing shield having light blocking discontinuities adapted to eliminate intense glare at the anticipated position of an operator without causing an equivalent reduction in the intensity of the projected beam.

2. A projector as defined in claim 1 wherein said lens is a Fresnel lens and said shield is comprised of a series of opaque thin louvers disposed between said lens and said image and crossing that diameter of said lens which extends toward said anticipated position.

3. The projector of claim 2 wherein said louvers have an aspect ratio of between about 2 and about 4.

4. The projector of claim 3 wherein said louvers are disposed within a transparent matrix.

5. The projector of claim 4 wherein said matrix is planar and said louvers are parallel, uniformly spaced, and perpendicular to the plane of said matrix.

6. The projector of claim 4 wherein each of said louvers is generally parallel to the projection light rays from said lens at the position of the louver.

7. A projector as defined in claim 4 wherein said shield is in the form of a generally square-shaped flat panel and wherein the louvers are perpendicular to the plane of the panel.

8. The projector of claim 5 wherein the shield is placed against the lower surface of the stage and separated from the Fresnel lens with the projector in vertical use position.

9. A projector as defined in claim 6 wherein said shield has the cross-sectional form of a shallow bowl and is disposed directly above said lens.

10. A projector as defined in claim 9 wherein said shield is supported beneath said stage within an open square frame having narrow shield-supporting inner ledges along the two opposing sides and narrow shield-suppressing inner ledges along the two opposing ends.

11. Method of improving the effectiveness of an overhead projector having a condensing lens beneath the transparency-supporting stage, comprising inserting between said lens and the position of the projection image and within the light path a glare-reducing shield having light blocking discontinuities for eliminating intense glare along the dameter of said lens extending toward the anticipated position of the operator without causing an equivalent reduction in the intensity of the projected beam.

12. Method of claim 11 wherein the shield is supported at its edges above and out of contact with the lens with the projector in vertical use position.

References Cited

UNITED STATES PATENTS

| | | | |
|---|---|---|---|
| 2,012,230 | 8/1935 | Grant | 240—46.39 |
| 2,053,173 | 9/1936 | Astima | 350—117 |
| 3,126,786 | 3/1964 | Appeldorn | 353—98 |
| 3,255,665 | 6/1966 | Weiher et al. | 350—262 |
| 3,320,854 | 5/1967 | Wally | 353—27 |

FOREIGN PATENTS

| | | |
|---|---|---|
| 530,948 | 12/1940 | Great Britain. |
| 1,053,754 | 2/1954 | France. |

SAMUEL S. MATTHEWS, Primary Examiner